United States Patent
Sawada et al.

(10) Patent No.: US 8,833,730 B2
(45) Date of Patent: Sep. 16, 2014

(54) CAM CONTROL VALVE

(75) Inventors: Yohei Sawada, Osaka (JP); Ryousuke Dohi, Osaka (JP); Kouji Nishino, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 286 days.

(21) Appl. No.: 13/389,671

(22) PCT Filed: Nov. 5, 2010

(86) PCT No.: PCT/JP2010/006509
§ 371 (c)(1),
(2), (4) Date: Feb. 9, 2012

(87) PCT Pub. No.: WO2011/064948
PCT Pub. Date: Jun. 3, 2011

(65) Prior Publication Data
US 2012/0223265 A1   Sep. 6, 2012

(30) Foreign Application Priority Data

Nov. 30, 2009 (JP) .................................. 2009-272752

(51) Int. Cl.
| | |
|---|---|
| *F16K 31/02* | (2006.01) |
| *F16K 25/00* | (2006.01) |
| *F16K 31/44* | (2006.01) |
| *F16K 31/00* | (2006.01) |
| *H02K 5/00* | (2006.01) |
| *F16K 31/04* | (2006.01) |
| *F16K 7/16* | (2006.01) |
| *F16K 31/524* | (2006.01) |

(52) U.S. Cl.
CPC ................. *F16K 7/16* (2013.01); *F16K 31/047* (2013.01); *F16K 31/52408* (2013.01)
USPC ... 251/129.11; 251/157; 251/263; 251/335.2; 310/91

(58) Field of Classification Search
USPC ............ 251/129.11, 263, 262, 260, 259, 257, 251/251, 157, 187, 80, 129.19, 335.2
See application file for complete search history.

(56) References Cited

U.S. PATENT DOCUMENTS 4,696,195 A   9/1987 Savonlahti et al.

(Continued)

FOREIGN PATENT DOCUMENTS

| JP | 61-21475 A | 1/1986 |
|---|---|---|
| JP | 61-117971 U | 7/1986 |

(Continued)

*Primary Examiner* — Elizabeth Houston
*Assistant Examiner* — Josephine Trinidad-Borges
(74) *Attorney, Agent, or Firm* — Griffin & Szipl, P.C.

(57) ABSTRACT

A cam control valve includes a valve casing having a fluid passage and valve seat, a valve disc seated on the valve seat to open and close the fluid passage, a valve stem holding down the valve disc so it contacts the valve seat, a cam acting on the valve stem to hold it down, a motor rotating the cam, a motor holder holding the motor, a supporting frame fixed to the valve casing and supporting the motor holder so it moves vertically, an elastic member biasing the motor holder towards spacing from an upper side portion of the supporting frame, and height adjustable screws suspending the motor holder from the supporting frame, and adjusting a height of the motor holder with respect to the supporting frame, wherein the height adjustable screws are slidably inserted into the upper side portion of the supporting frame and screwed into the motor holder.

7 Claims, 6 Drawing Sheets

(56) References Cited

U.S. PATENT DOCUMENTS

| | | |
|---|---|---|
| 5,176,037 A | 1/1993 | Kasprzyk |
| 8,561,966 B2 * | 10/2013 | Dohi et al. .................... 251/254 |
| 2010/0207044 A1 | 8/2010 | Dohi et al. |

FOREIGN PATENT DOCUMENTS

| | | |
|---|---|---|
| JP | 61-117972 U | 7/1986 |
| JP | 2008-57594 A | 3/2008 |
| WO | WO 2008026306 A1 * | 3/2008 |

* cited by examiner

CAM CONTROL VALVE

This is a National Phase Application in the United States of International Patent Application No. PCT/JP2010/006509 filed Nov. 5, 2010, which claims priority on Japanese Patent Application No. 2009-272752, filed Nov. 30, 2009. The entire disclosures of the above patent applications are hereby incorporated by reference.

TECHNICAL FIELD OF THE INVENTION

The present invention relates to improvements in a control motor-driven cam control valve that is installed along, mainly, a fluid supply line in semiconductor manufacturing facilities, photovoltaic manufacturing processes, or the like, or a refrigerant circulation circuit in a chiller unit, or the like, to be used for regulating a flow rate of fluid, such as a gas or refrigerant. In particular, the present invention relates to improvements in a control motor-driven cam control valve by which it is possible to minutely and precisely regulate a flow rate of gas, refrigerant, or the like.

BACKGROUND ART AND BACKGROUND OF THE INVENTION

Conventionally, control motor-driven cam control valves are disclosed in, for example, Japanese Published Unexamined Utility Model Application No. 61-117971 (reference document 1) and Japanese Published Unexamined Utility Model Application No. 61-117972 (reference document 2).

That is, the cam control valve includes, although not illustrated, a valve casing having a fluid passage and a valve seat, a valve disc that is seated on, and leaves, the valve seat of the valve casing, an elastic body that biases the valve disc in a direction of leaving from the valve seat, a valve stem that is coupled to the valve disc to be supported so as to be freely movable up and down by a top cover of the valve casing, a cam plate that comes into contact with a cam roller provided at an upper end portion of the valve stem to hold down the valve stem, a stepping motor (pulse motor) that drivingly rotates the cam plate, and the like. In the cam control valve, the stepping motor rotates the cam plate to hold down the valve stem via the cam plate, thereby making the valve disc provided at the lower end of the valve stem come into contact with the valve seat.

The stepping motor-driven cam control valve is capable of performing high-accuracy flow rate regulation, which results in excellent practical effects.

Meanwhile, in a cam control valve using a stepping motor, because a cam plate is rotated by a predetermined angle in accordance with a number of pulses supplied to the stepping motor, and a valve stem and a valve disc are slightly displaced by the rotation of the cam plate to regulate a flow rate of fluid, it is necessary to perform zero adjustment so that the valve disc, and the valve stem, are accurately located at a zero position (i.e., a fully open position or a fully closed position) when the valve is fully open or fully closed.

That is, it is necessary to make adjustments so that a minimum radius portion of the cam plate comes into contact with a cam roller, and the valve disc and the valve seat are spaced from each other at a maximum when the valve is fully open. It is also necessary to make adjustments so that a maximum radius portion of the cam plate comes into contact with the cam roller, and the valve disc is seated on the valve seat with an appropriate force when the valve is fully closed.

However, the conventional stepping motor-driven cam control valve described above is not equipped with any adjusting mechanism that adjusts a position of the valve disc, and the like, to the zero position. This brings about the problem that it takes much time and energy for zero adjustment of the valve.

Furthermore, unless a processing accuracy, an assembling accuracy, and the like, of the respective components in the cam control valve are improved, the valve disc may be excessively pressed against the valve seat, or the contact between the valve disc and the valve seat may be insufficient in some cases. As a result, there is a problem in that the valve seat, or the like, of the valve may be damaged, or fluid may be leaked.

In order to solve such problems, the inventors of the present invention, and others, have provided a cam control valve equipped with a height adjusting mechanism by which it is possible to fine adjust an actuator composed of a stepping motor and a cam mechanism in a vertical direction (for example, see Patent Document 3).

With the cam control valve in Patent Document 3, it is easy to fine adjust a vertical height of the actuator because the height adjusting mechanism is provided. However, an adjustable screw of the height adjusting mechanism may be hard to access in some cases. Furthermore, with the cam control valve in Patent Document 3, it is impossible to easily finely adjust force with which the valve disc comes into contact with the valve seat after height adjustment for the actuator.

PRIOR ART DOCUMENTS

Patent Documents

Patent Document 1: Japanese Published Unexamined Utility Model Application No. 61-117971.
Patent Document 2: Japanese Published Unexamined Utility Model Application No. 61-117972.
Patent Document 3: Japanese Published Unexamined Patent

SUMMARY OF THE INVENTION

Problems to be Solved by the Invention

The present invention has been achieved in consideration of the above-described problems. It is a main object of the present invention to provide a cam control valve in which an adjustable screw is easily accessed when vertically adjusting a height of a motor to which a cam is mounted. Moreover, it is an object of the present invention to provide a cam control valve by which it is possible to adjust a contact pressure when a valve disc comes into contact with a valve seat.

Means for Solving the Problem

In order to solve the above-described problems of the prior art, a cam control valve according to one embodiment of the present invention includes a valve casing that has a fluid passage and a valve seat provided along the fluid passage, a valve disc that is seated on and leaves the valve seat to open and close the fluid passage, a valve stem that is configured to hold down the valve disc to bring the valve disc into contact with the valve seat so as to close the fluid passage, a cam that acts on the valve stem to press the valve stem in a direction of holding down the valve stem, a motor that drivingly rotates the cam, a motor holder that holds the motor, a supporting frame fixed to the valve casing, that supports the motor holder so as to make the motor holder vertically movable, an elastic member that biases the motor holder in a direction in which the motor holder is spaced from an upper side portion of the supporting frame, and a height adjustable screw that supports the motor holder in a state of suspension from the supporting frame, and is for adjusting a height of the motor holder with respect to the supporting frame, wherein the height adjustable screw is slidably inserted into the upper side portion of the supporting frame, and is screwed into the motor holder.

It is preferable that the cam control valve according to the embodiment of the present invention further include a seat-contact pressure adjusting mechanism for adjusting a contact pressure of the valve disc onto the valve seat.

It is preferable that the seat-contact pressure adjusting mechanism have a piston member that comes into contact with the elastic member, and an elastic force adjustable screw that is screwed into the upper side portion of the supporting frame, to press the piston member so as to adjust elastic force of the elastic member.

It is preferable that the elastic member be housed in a first cylindrical concave portion formed in a top face of the motor holder, and at least a part of the piston member be fit into the first cylindrical concave portion.

It is preferable that a second cylindrical concave portion be formed in a bottom face of the upper side portion of the supporting frame, and a lower side portion of the piston member be fit into the first cylindrical concave portion, and an upper side portion of the piston member be fit into the second cylindrical concave portion, and a screw hole for the elastic force adjustable screw be communicated with the second cylindrical concave portion.

It is preferable that the supporting frame be equipped with a pair of supporting columns vertically installed upright, and concave faces that are slidably in contact with side faces, which face each other, of the pair of supporting columns, be formed in side faces of the motor holder.

It is preferable that the cam have a cylindrical shape, and the cam be provided at a position at which a rotation center is decentered (off centered) from the center of a circle of the cylindrical shape.

Effect of the Invention

With the cam control valve according to an embodiment of the present invention, while biasing the motor holder in a direction in which the motor holder is spaced from the upper side portion of the supporting frame by the elastic member, the height adjustable screw slidably inserted into the upper side portion of the supporting frame is screwed into the motor holder, and the motor holder is supported in a state of suspension from the supporting frame with the height adjustable screw. Therefore, the height adjustable screw is accessed, from above the supporting frame, to adjust a screwing level of the height adjustable screw, thereby it is possible to adjust a vertical height of the motor to which the cam is mounted.

Furthermore, the piston member is brought into contact with the elastic member, and the piston member is further pressed by the elastic force adjustable screw screwed into the upper side portion of the supporting frame, to adjust elastic force of the elastic member. Thereby, it is possible to adjust a contact pressure of the valve disc onto the valve seat when the valve disc is seated on the valve seat. Because the elastic force adjustable screw is screwed into the upper side portion of the supporting frame, it is easy to access the elastic force adjustable screw at the time of adjusting it.

In accordance with a first illustrative embodiment of the present invention, a cam control valve is provided that includes: (a) a valve casing, which has a fluid passage and a valve seat provided along the fluid passage; (b) a valve disc, which is seated on and leaves the valve seat to open and close the fluid passage; (c) a valve stem, which is configured to hold down the valve disc to bring the valve disc into contact with the valve seat so as to close the fluid passage; (d) a cam, which acts on the valve stem to press the valve stem in a direction of holding down the valve stem; (e) a motor that drivingly rotates the cam; (e) a motor holder that holds the motor; (f) a supporting frame fixed to the valve casing, that supports the motor holder so as to make the motor holder vertically movable; (g) an elastic member that biases the motor holder in a direction in which the motor holder is spaced from an upper side portion of the supporting frame; and (h) a height adjustable screw, which supports the motor holder in a state of suspension from the supporting frame, and is for adjusting a height of the motor holder with respect to the supporting frame, wherein the height adjustable screw is slidably inserted into the upper side portion of the supporting frame, and is screwed into the motor holder. In accordance with a second illustrative embodiment of the present invention, the first illustrative embodiment is modified so that the cam control valve further includes (i) a seat-contact pressure adjusting mechanism for adjusting a contact pressure of the valve disc onto the valve seat. In accordance with a third illustrative embodiment of the present invention, the second illustrative embodiment is further modified so that the seat-contact pressure adjusting mechanism includes a piston member, which comes into contact with the elastic member, and an elastic force adjustable screw, which is screwed into the upper side portion of the supporting frame, to press the piston member so as to adjust elastic force of the elastic member.

In accordance with a fourth illustrative embodiment of the present invention, the third illustrative embodiment is further modified so that the elastic member is housed in a first cylindrical concave portion formed in a top face of the motor holder, and at least a part of the piston member is fit into the first cylindrical concave portion. In accordance with a fifth illustrative embodiment of the present invention, the fourth illustrative embodiment is further modified so that a second cylindrical concave portion is formed in a bottom face of the upper side portion of the supporting frame, a lower side portion of the piston member is fit into the first cylindrical concave portion and an upper side portion of the piston member is fit into the second cylindrical concave portion, and a screw hole for the elastic force adjustable screw is communicated with the second cylindrical concave portion. In accordance with a sixth illustrative embodiment of the present invention, the first illustrative embodiment is modified so that the supporting frame is equipped with a pair of supporting columns vertically installed upright, and concave faces, which are slidably in contact with side faces, which face each other, of the pair of supporting columns, are formed in side faces of the motor holder. In accordance with a seventh illustrative embodiment of the present invention, the first illustrative embodiment is modified so that the cam has a cylindrical shape, which is provided at a position at which a rotation center is decentered from the center of a circle of the cylindrical shape.

DETAILED DESCRIPTION WITH BEST MODE FOR CARRYING OUT THE INVENTION

Figure 1:
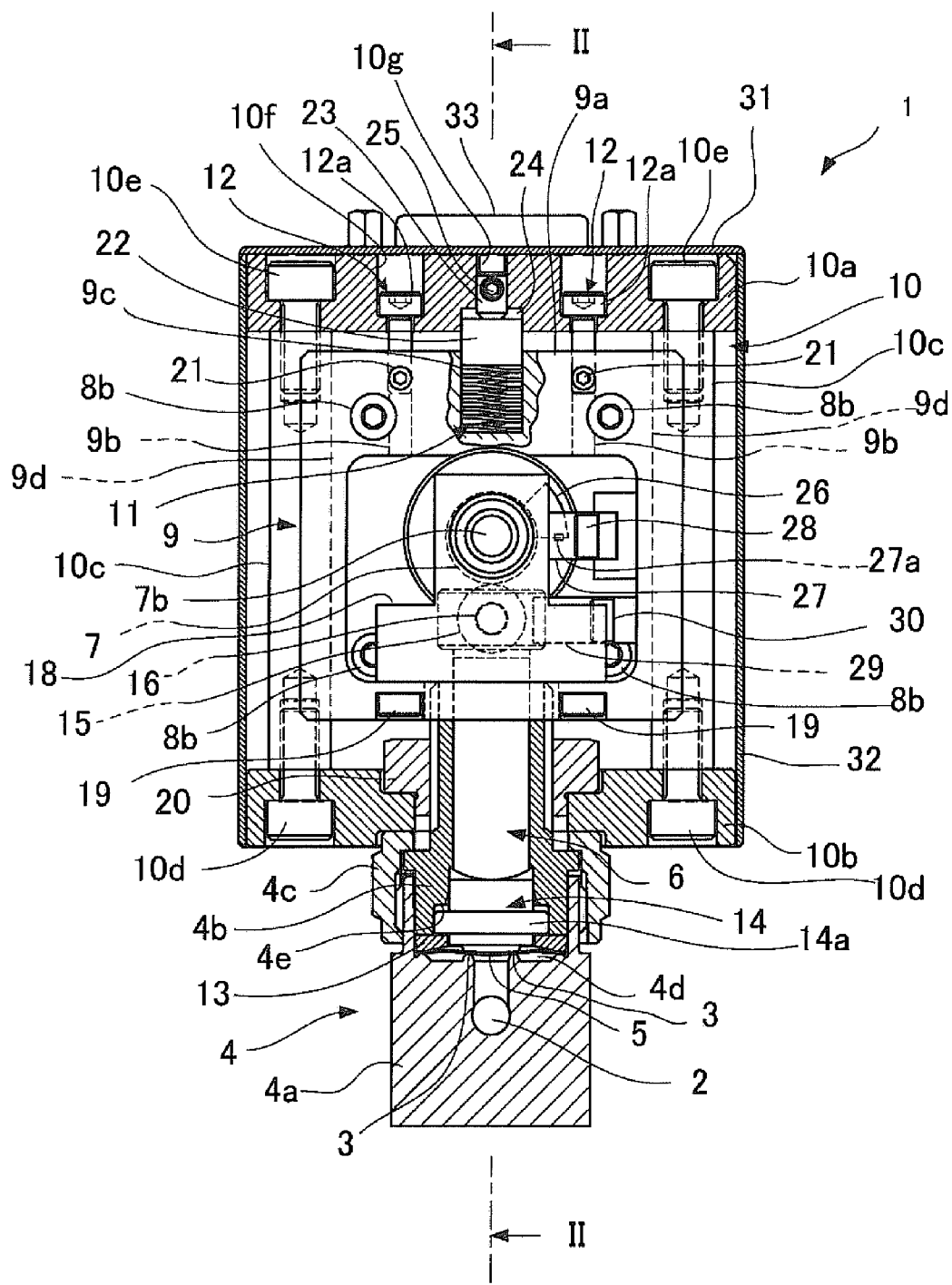
FIG. 1 is a cross-sectional view taken along the line I-I of FIG. 2, which shows a fully closed state of a cam control valve according to an embodiment of the present invention.

An embodiment of a cam control valve, according the present invention, will be hereinafter described with reference to FIGS. 1 to 7. In addition, the same components are designated by the same reference numerals through all the drawings.

A cam control valve 1 of the present invention includes a valve casing 4, which has a fluid passage 2 and a valve seat 3 provided along the fluid passage 2, a valve disc 5 that leaves the valve seat 3 to be elastically restorable so as to open the fluid passage 2, a valve stem 6 that is configured to hold down the valve disc 5 to bring the valve disc 5 into contact with the valve seat 3 so as to close the fluid passage 2, a cam 7 that acts on the valve stem 6 to press the valve stem 6 in a direction of holding down the valve stem 6, a motor 8 that drivingly rotates the cam 7, a motor holder 9 that holds the motor 8, a supporting frame 10 fixed to the valve casing 4, which supports the motor holder 9 so as to make the motor holder 9 vertically movable, an elastic member 11 that biases the motor holder 9 in a direction in which the motor holder 9 is spaced from an upper side portion 10a of the supporting frame 10, and height adjustable screws 12, which support the motor holder 9 in a state of suspension from the supporting frame 10, and are for adjusting a height of the motor holder 9 with respect to the supporting frame 10.

In the valve casing 4, a body 4a in which the fluid passage 2 is formed is covered with a bonnet 4b, and the bonnet 4b is fixed to the body 4a with a bonnet nut 4c.

In the illustrated example, the valve disc 5 is formed of a metal diaphragm. The metal diaphragm comprising the valve disc 5 is fixed to the body 4a via an annular presser adaptor 13 by the bonnet 4b. The metal diaphragm has a curved shape, whose central portion is arched to a certain extent to be separated from the valve seat 3 when the valve is open. When the metal diaphragm is pressed by the valve stem 6, the metal diaphragm is elastically deformed to come into contact with the valve seat 3 so as to close the fluid passage 2, and when the pressing by the valve stem 6 is released, the metal diaphragm is elastically restored by self-preserving elasticity to open up the fluid passage 2. A valve chamber 4d is formed between the metal diaphragm and the valve seat 3. A well-known metal diaphragm formed of a thin plate of nickel-cobalt alloy, or the like, may be used as the metal diaphragm.

Figure 3:
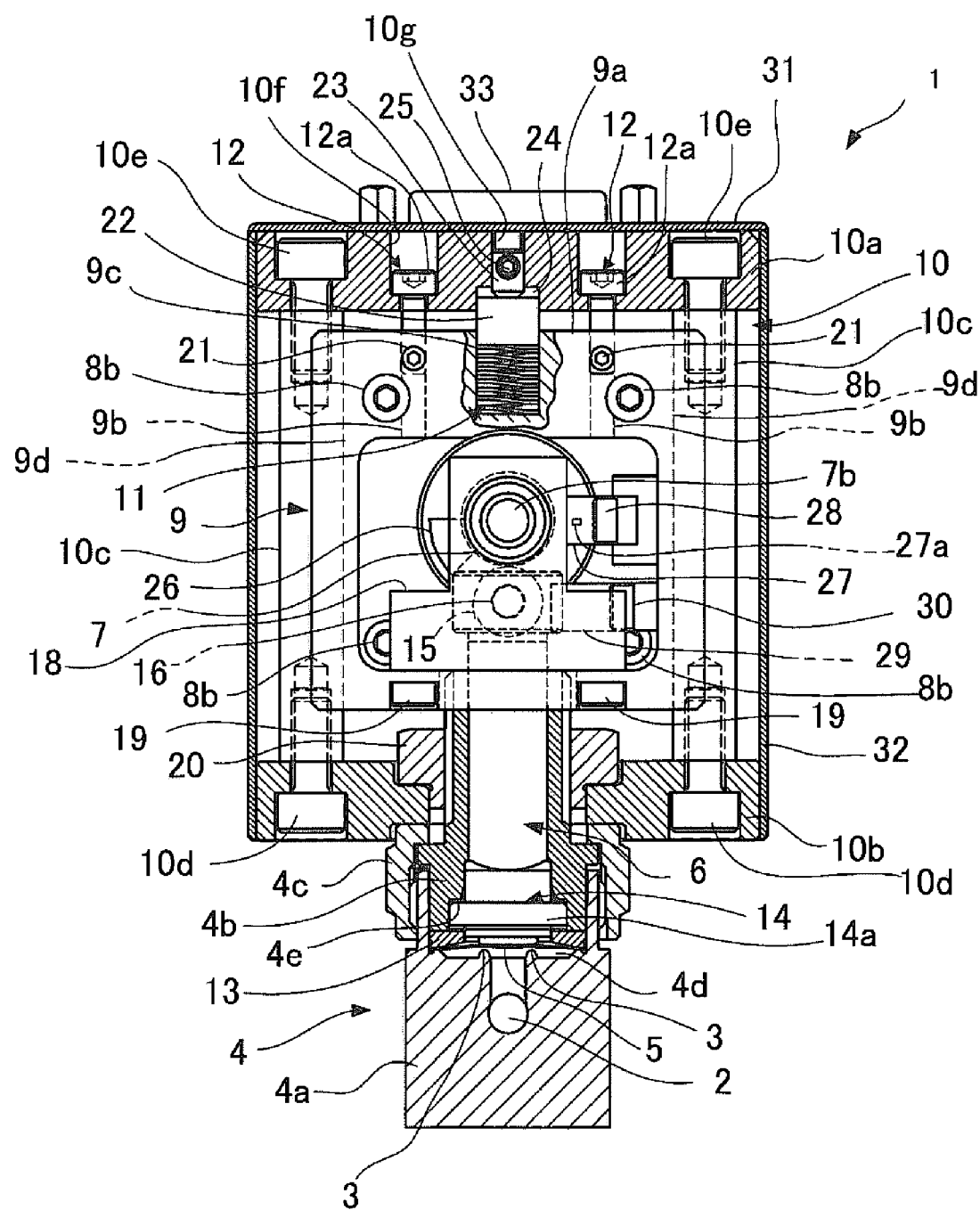
FIG. 3 is a cross-sectional view showing a fully open state of the cam control valve of FIG. 1.
Figure 4:
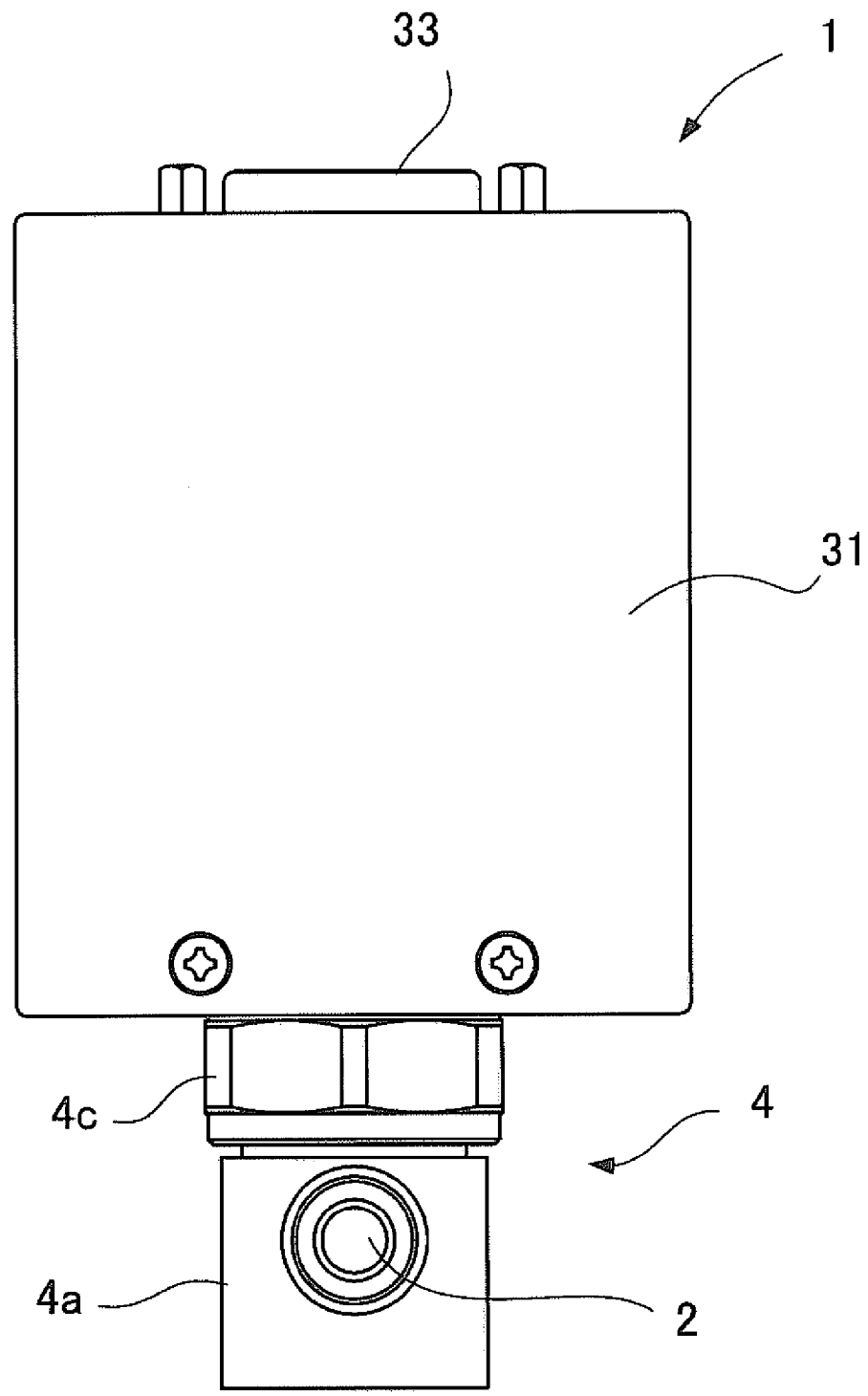
FIG. 4 is a front view showing an appearance of the cam control valve of FIG. 1.
Figure 5:
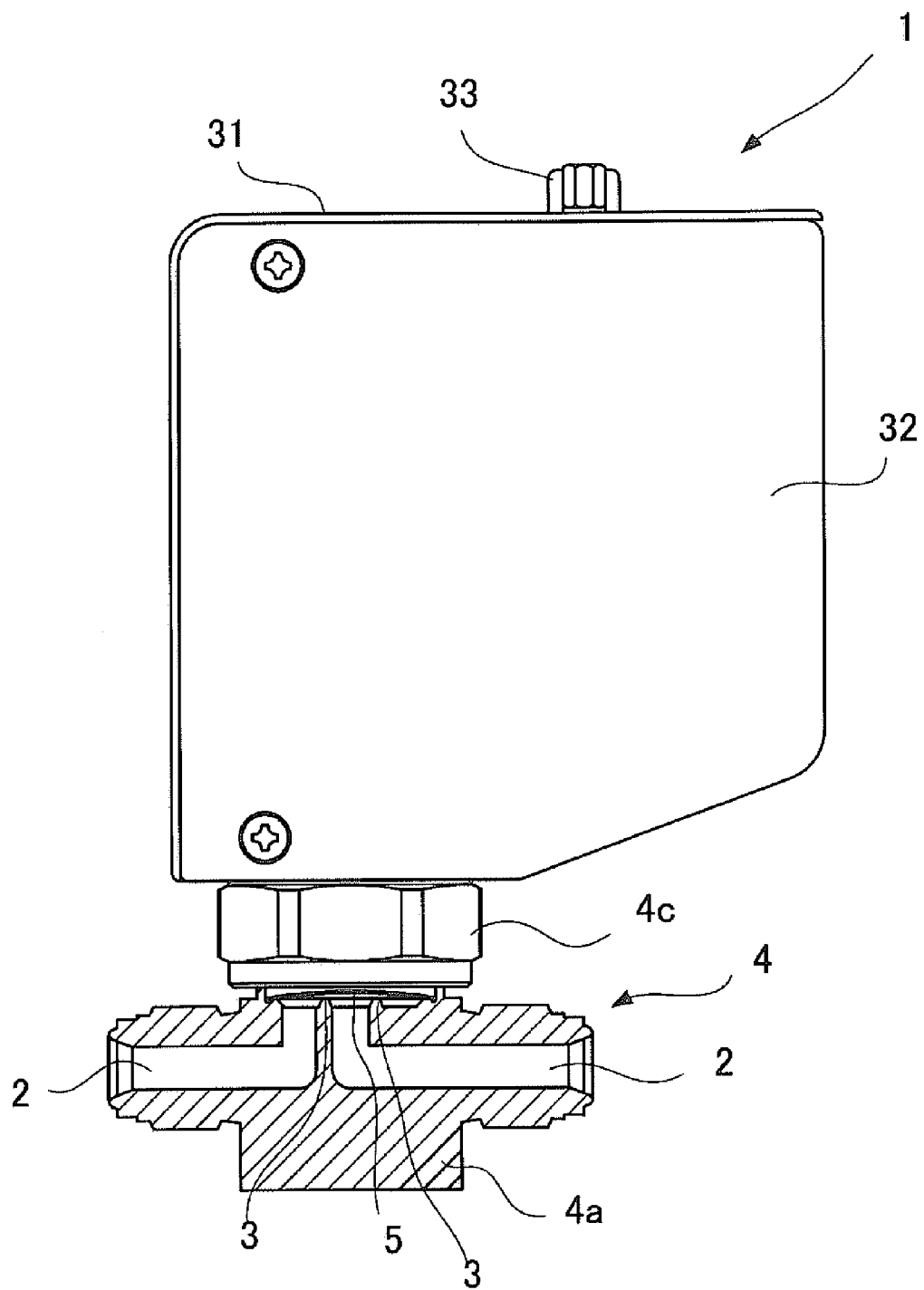
FIG. 5 is a partial cross-sectional side view showing an appearance of the cam control valve of FIG. 1.

The valve stem 6 is placed on a diaphragm presser 14. The diaphragm presser 14 is formed into a disc shape with a flange 14a. The flange 14a is, as shown in FIGS. 1 and 3, vertically movable between the presser adaptor 13 and a step portion 4e in the bonnet 4b.

Figure 2:
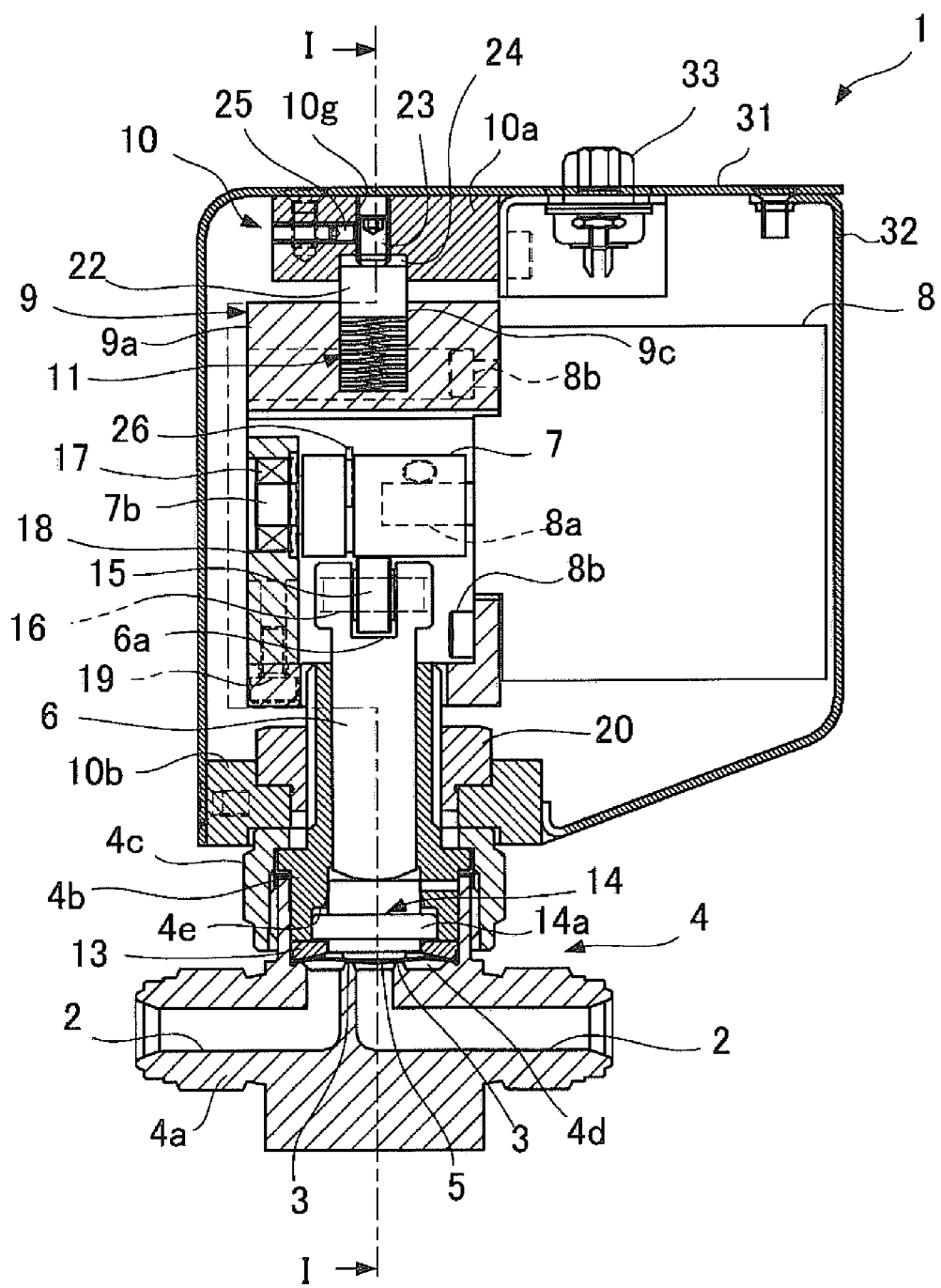
FIG. 2 is a cross-sectional view taken along the line II-II of the cam control valve shown in FIG. 1.

The valve stem 6 is guided to be supported so as to be vertically movable by the bonnet 4b. As shown in FIG. 2, a groove 6a is formed in an upper end portion of the valve stem 6, and a bearing 15 is supported so as to be freely rotatable via a spring pin 16 in the groove 6a.

Figure 6:
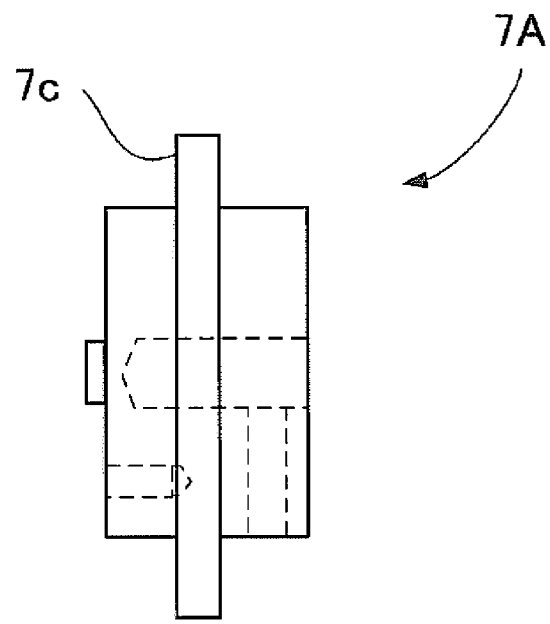
FIG. 6 is a side view showing a modified embodiment of a cam.
Figure 7:
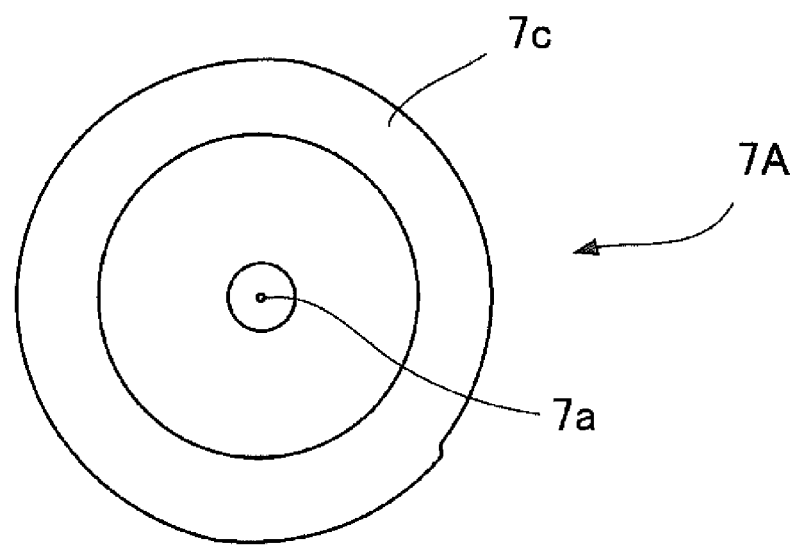
FIG. 7 is a front view of the cam shown in FIG. 6.

The bearing 15 is in contact with the cam 7. The cam 7 is columnar, and is fixed to a rotary shaft 8a of the motor 8 such that a position becomes decentered (i.e., off centered or offset) by a predetermined distance (0.2 mm in the illustrated example) from the central axis line. In addition, in place of the cam 7 shown in FIGS. 1 and 2, a cam 7A in which, as shown in FIGS. 6 and 7, a cam plate 7c is provided, and a distance from a rotation center 7a to the cam plate 7c is gradually changed in the rotation direction to form a cam surface, may be used.

The motor holder 9 is mounted to the motor 8 via mounting screws 8b. The motor holder 9 has a box shape, whose front face is open, and the cam 7 and an inverted T-shaft bush portion 18 that receives a front end shaft 7b of the cam 7 via a bearing 17 are housed in the motor holder 9. The shaft bush portion 18 is fixed to the motor holder 9 with mounting screws 19. A position-controllable motor is used as the motor 8, and a stepping motor is used in the illustrated example.

The supporting frame 10 includes a plate-like base 10b fixed to the valve casing 4 with a locking nut 20, a pair of supporting columns 10c installed upright on the base 10b, and the upper side portion 10a fixed so as to be suspended between the upper portions of the pair of supporting columns 10c. The pair of supporting columns 10c are fixed to the base 10b with fixation screws 10d, and are fixed to the upper side portion 10a with fixation screws 10e.

The height adjustable screws 12 are slidably inserted into stepped through holes 10f formed in the upper side portion 10a of the supporting frame 10, and head portions 12a thereof are supported so as to be in contact with the step portions of the stepped through holes 10f. Male screw portions of the height adjustable screws 12 pass through the supporting frame 10 to be screwed into female screw holes 9b formed in the upper side portion 9a of the motor holder 9. The height adjustable screws 12 are fixed with retaining screws 21. In addition, the height adjustable screws 12 may be inserted into flat washers (not shown), and the flat washers may be brought into contact with the step portions of the stepped through holes 10f to support the height adjustable screws 12 by the supporting frame 10.

The elastic member 11 is a coil spring in the illustrated example, and is housed in a first cylindrical concave portion 9c formed in the top face of the motor holder 9. In place of the coil spring, for example, a plurality of spring washers may be used in stacks as the elastic member 11. The elastic member 11 has an elastic pressing force sufficiently greater than the elastic restoring force of the metal diaphragm composing the valve disc 5.

A piston member 22 is in contact with the elastic member 11, and an elastic force adjustable screw 23 screwed into the upper side portion 10a of the supporting frame 10 presses the piston member 22. A lower side portion of the piston member 22 is fit into the first cylindrical concave portion 9c. A second cylindrical concave portion 24 is formed in the bottom face of the upper side portion 10a of the supporting frame 10, and the upper side portion of the piston member 22 is fit into the second cylindrical concave portion 24. A screw hole 10g for the elastic force adjustable screw 23 formed in the upper side portion 10a communicates with the second cylindrical concave portion 24. With the configuration in which the top and bottom portions of the piston member 22 are fit into the upper and lower concave portions 9c and 24, the piston member 22 is stably guided. The elastic force adjustable screw 23 is fixed with a retaining screw 25.

Concave faces 9d, which are slidably in contact with the side faces, which face each other, of the pair of supporting columns 10c, are respectively formed in both side faces of the motor holder 9. These concave faces 9d act as guide faces when the motor holder 9 vertically moves, and the guide faces longitudinally extend over the side faces of the motor holder 9, thereby stably guiding the motor holder 9.

A fan-like sensor plate 26 is fixed to the cam 7. A sensor 27 that senses the sensor plate 26 is fixed to the motor holder 9 with a fixation screw 28. For example, a photo-microsensor may be used as the sensor 27, and it is possible to detect a rotation angular position of the cam 7 by detecting that the sensor plate 26 comes across an optical axis position 27a of the sensor 27.

A regulatory member 29 that regulates rotation around the axis line of the valve stem 6 is fixed so as to protrude on the inner wall of the motor holder 9 with a fixation screw 30. In detail, a leading end portion of the regulatory member 29 engages with the groove 6a in which the bearing 15 of the valve stem 6 is housed, to regulate rotation around the axis line of the valve stem 6.

Casing covers 31 and 32 are fixed to the supporting frame 10, and a connector 33 for connecting a cable is mounted on the top panel of the casing cover 31.

Operations of the cam control valve having the above-described configuration will be hereinafter described.

First, as shown in FIG. 1, the cam 7 is rotated to a position at which a distance between the rotation center of the cam 7 and the bearing 15 is maximized. At this time, as shown in FIGS. 1 and 2, the cam 7 is at a position at which the cam 7 holds down the valve stem 6 and the diaphragm presser 14 against the retaining elasticity of the metal diaphragm comprising the valve disc 5, to elastically deform the metal diaphragm, thereby bringing the metal diaphragm into contact with the valve seat 3 so as to close the fluid passage 2. At this position, the sensor plate 26 blocks the optical axis 27a of the sensor 27, and the sensor 27 detects a position of the sensor plate 26.

In this state in which the valve is closed, screwing levels of the height adjustable screws 12 and a screwing level of the elastic force adjustable screw 23 are adjusted so as to ensure desired sealing performance.

Height positions of the motor holder 9 and the cam 7 are adjusted by adjusting screwing levels of the height adjustable screws 12. Because the height adjustable screws 12 can be accessed from above the cam control valve 1, it is easy to adjust their screwing levels. Furthermore, a height size for forming a space for accessing is required under the cam control valve with a configuration in which the height adjustable screws are accessed from under the cam control valve. In contrast, with the configuration in which the height adjustable screws 12 can be accessed from above the cam control valve 1, it is possible to decrease the height size.

A screwing level of the elastic force adjustable screw 23 is changed to change the elastic force of the elastic member 11. As a result, the force by which the valve stem 6 and the diaphragm presser 14 press the valve disc 5 comprising the metal diaphragm varies. In this way, the seat-contact pressure adjusting mechanism that adjusts a contact pressure of the valve disc 5 onto the valve seat 3 is configured. In addition, in this case, because the elastic force adjustable screw 23, as well, can be accessed from above the supporting frame 10, its operability is good.

When desired sealing performance is ensured in the state in which the valve is closed as described above, a pulse signal is transmitted to the motor 8, to rotate the cam 7 in the anticlockwise (counterclockwise) direction of FIG. 1. When the cam 7 is rotated in the anticlockwise (counterclockwise) direction from the state in which the valve disc 5 is in contact with the valve seat 3 (FIG. 1), a distance between the rotation center of the cam 7 and the bearing 15 is shortened, and the valve disc 5 is separated from the valve seat 3 by the self-elastic force of the metal diaphragm comprising the valve 5, to open up the fluid passage 2 as shown in FIG. 3.

When a flow rate of the fluid flowing in the fluid passage 2 reaches a desired value after opening up the fluid passage 2, the rotation of the motor 8 is stopped, and a rotation angular position at the stopped position is stored in a control circuit (not shown) of the motor, to set it to a maximum opening.

The present invention is not limited to the above-described embodiment(s), and modifications of the present invention are possible within the range that does not deviate from the gist of the present invention. The present invention may be configured such that, in place of the valve disc of metal diaphragm separately independent of the valve stem, a well-known valve disc of a type in which the valve disc is fixedly coupled to the lower end portion of a valve stem (for example, a valve disc fixedly coupled to the lower end portion of a valve stem, which is as shown in Japanese Published Unexamined Utility Model Application No. 61-117971, Japanese Published Unexamined Utility Model Application No. 61-117972, and FIG. 3 in Japanese Published Unexamined Patent Application No. 2008-57594) is adopted, to prevent leakage of fluid with a bellows, or a diaphragm mounted to the valve stem or the valve disc.

INDUSTRIAL APPLICABILITY

The cam control valve according to the present invention is utilized for a fluid supply line in semiconductor manufacturing facilities, and the like, or a refrigerant circulation circuit in a chiller unit. As described above, a cam control valve 1, in accordance with the present invention, includes a valve casing 4 that has a fluid passage 2 and a valve seat 3, a valve disc 5 that is seated on and leaves the valve seat 3 so as to open and close the fluid passage 2, a valve stem 6 that holds down the valve disc 5 to bring the valve disc 5 into contact with the valve seat 3, a cam 7 that acts on the valve stem 6 to hold down the valve stem 6, a motor 8 that drivingly rotates the cam 7, a motor holder 9 that holds the motor 8, a supporting frame 10 fixed to the valve casing 4, that supports the motor holder 9 so as to make the motor holder 9 vertically movable, an elastic member 11 that biases the motor holder 9 in a direction in which the motor holder 9 is spaced from an upper side portion of the supporting frame 10, and height adjustable screws 12 that support the motor holder 9 in a state of being suspended from the supporting frame 10, and are for adjusting a height of the motor holder 9 with respect to the supporting frame 10, and the height adjustable screws 12 that are slidably inserted into the upper side portion of the supporting frame 10, and are screwed into the motor holder 9. Objects for utilization are not limited to the semiconductor manufacturing devices, and the like, and the cam control valve is utilized for a fluid supply line in various types of devices in the chemical industry, medical industry, food industry, and the like.

DESCRIPTION OF SYMBOLS

1 Cam control valve
2 Fluid passage
3 Valve seat
4 Valve casing
5 Valve disc
6 Valve stem
7 Cam
8 Motor
9 Motor holder
9c First cylindrical concave portion
10 Supporting frame
11 Elastic member
12 Height adjustable screw
22 Piston member
23 Elastic force adjustable screw
24 Second cylindrical concave portion

The invention claimed is:

1. A cam control valve comprising:
   (a) a valve casing that has a fluid passage formed therein, and a valve seat provided along the fluid passage;
   (b) a valve disc that is seated on the valve seat and that leaves the valve seat to open and close the fluid passage;
   (c) a valve stem that is configured to hold down the valve disc to bring the valve disc into contact with the valve seat so as to close the fluid passage;
   (d) a cam disposed to act on the valve stem to press the valve stem in a direction of holding down the valve stem;
   (e) a motor that is disposed to drivingly rotate the cam;
   (f) a motor holder that holds the motor;
   (g) a supporting frame fixed to the valve casing, wherein the supporting frame supports the motor holder so that the motor holder is vertically movable;
   (h) an elastic member that biases the motor holder in a direction in which the motor holder is spaced from an upper side portion of the supporting frame; and
   a height adjustable screw that supports the motor holder in a state of suspension from the supporting frame, and the height adjustable screw adjusts a height of the motor holder with respect to the supporting frame, wherein the height adjustable screw is slidably inserted into the upper side portion of the supporting frame, and the height adjustable screw is screwed into the motor holder.

2. The cam control valve according to claim 1, further comprising:
   (i) a seat-contact pressure adjusting mechanism disposed to adjust a contact pressure of the valve disc onto the valve seat.

3. The cam control valve according to claim 2, wherein the seat-contact pressure adjusting mechanism includes
   i. a piston member that comes into contact with the elastic member, and
   ii. an elastic force adjustable screw that is screwed into the upper side portion of the supporting frame in order to press the piston member so as to adjust elastic force of the elastic member.

4. The cam control valve according to claim 3, wherein the elastic member is housed in a first cylindrical concave portion formed in a top face of the motor holder, and
   at least a part of the piston member is fitted into the first cylindrical concave portion.

5. The cam control valve according to claim 4, wherein a second cylindrical concave portion is formed in a bottom face of the upper side portion of the supporting frame, and
   a lower side portion of the piston member is fitted into the first cylindrical concave portion and an upper side portion of the piston member is fitted into the second cylindrical concave portion, and
   a screw hole for the elastic force adjustable screw communicates with the second cylindrical concave portion.

6. The cam control valve according to claim 1, wherein the supporting frame is equipped with a pair of supporting columns vertically installed in an upright position, and in first side faces of the motor holder are formed concave faces that are slidably in contact with second side faces that face each other of the pair of supporting columns.

7. The cam control valve according to claim 1, wherein the cam has a cylindrical shape, wherein the cam is disposed at a position at which a rotation center of the cam is decentered from the center of a circle of the cylindrical shape of the cam.

* * * * *